United States Patent [19]

Hosoya

[11] Patent Number: 4,463,379
[45] Date of Patent: Jul. 31, 1984

[54] SYNCHRO SEPARATION CIRCUIT

[76] Inventor: Nobukazu Hosoya, 580-7, Hidehara, Heguri-cho, Ikoma-gun, Nara 636, Japan

[21] Appl. No.: 373,510
[22] PCT Filed: Sep. 8, 1981
[86] PCT No.: PCT/JP81/00223
§ 371 Date: Apr. 20, 1982
§ 102(e) Date: Apr. 20, 1982
[87] PCT Pub. No.: WO82/00933
PCT Pub. Date: Mar. 18, 1982

[30] Foreign Application Priority Data

Sep. 9, 1980 [JP] Japan .................. 55-125656

[51] Int. Cl.³ .............................................. H04N 5/08
[52] U.S. Cl. ..................................... 358/154; 358/153; 328/139
[58] Field of Search ............... 358/154, 153, 150, 151, 358/148; 328/139, 187; 307/527

[56] References Cited

U.S. PATENT DOCUMENTS

| | | | |
|---|---|---|---|
| 3,311,701 | 3/1967 | Lynch | 358/154 |
| 3,632,872 | 1/1972 | Ridley | 358/154 |
| 3,809,808 | 5/1974 | Arpin | 358/153 |
| 3,819,859 | 6/1974 | Borsuk | 358/154 |
| 3,879,576 | 4/1975 | Lkada | 358/153 |

Primary Examiner—Tommy P. Chin
Attorney, Agent, or Firm—Armstrong, Nikaido, Marmelstein & Kubovcik

[57] ABSTRACT

A synchro separation circuit for use in a television receiver set comprises an amplitude separation circuit and a frequency separation circuit and is so simple in construction as to render it to be suited for the fabrication into an integrated circuit. In order to increase the separation sensitivity relative to the vertical synchronizing signal, the amplitude separation circuit is so designed that a discharge circuit adapted to conduct during at least the vertical synchronizing signal period of the composite video signal is connected in parallel to a discharge resistor for a capacitor connected between the input transistor of the amplitude separation circuit and an emitter-follower circuit for supplying the composite video signal to the input transistor after the impedance conversion has been effected. The discharge circuit serves to increase the amount of current flowing to the input transistor of the amplitude separation circuit during the vertical synchronizing signal period to increase the separation sensitivity of the vertical synchronizing signal.

4 Claims, 5 Drawing Figures

1 ... Amplitude separation circuit, 2 ... Frequency separation circuit, $T_1$ ... Transistor forming an emitter-follower path, T169 ... Input transistor, T173, T174, T175 ... Trasistors forming a current Miller circuit, T200 ... Transistor forming a discharge circuit, T179, T180, T181 ... Transistors forming a comparator, $C_1$ ... Capacitor, $R_3$ ... Discharge resistor, $R_{319}$ ... Resistor forming a discharge circuit

SYNCHRO SEPARATION CIRCUIT

FIELD OF TECHNOLOGY

The present invention relates to a synchro separation circuit for use in a television receiver set and, more particularly, to a synchro separation circuit comprising an amplitude separation circuit and a frequency separation circuit, which is simple in construction and is suited for IC fabrication.

BACKGROUND ART

In general, the synchro separation circuit is constituted by an amplitude separation circuit for separating a composite synchronizing signal from a composite video signal and a frequency separation circuit separating a vertical synchronizing signal from the composite synchronizing signal.

Hitherto, in the amplitude separation circuit of the synchro separation circuit, if the separation sensitivity is increased when the composite synchronizing signal is desired to be separated from the composite video signal, an undesirable phenomenon so-called "video-in-sink" occurs wherein a video signal component of the composite video signal is separated as a synchronizing signal and, therefore, the separation sensitivity had hitherto been determined in reference to the separation of a horizontal synchronizing signal during the video signal duration.

However, since no video signal appear during the vertical blanking period, no video-in-sink occur and, therefore, it is possible to increase the separation sensitivity of the vertical synchronizing signal. Despite of this possibility, if the separation sensitivity of the amplitude separation circuit is set in reference to the separation of a horizontal synchronizing signal during the video signal duration, no vertical synchronizing signal can be separated without any fault when in a weak electric field, thereby posing a problem.

On the other hand, a frequency separation circuit generally utilizes an integrator to separate the vertical synchronizing signal. In this case, an integrating capacitor (and a resistor if necessary) has to be of a relatively large value and, therefore, where the synchro separation circuit is desired to be fabricated in an integrated circuit (hereinafter referred to as IC), the capacitor and the resistor have to be used as members separate from the IC. In addition, even though they can be fabricated in the IC, a large space is required for the installation of these component parts in the IC. Moreover, in the conventional circuit, the circuit itself is very complicated and hampers, in the presence of the above described disadvantages, the miniaturization and cost-reduction of the IC.

Accordingly, the present invention has been developed with a view of eliminating the above described disadvantages inherent in the conventional synchro separation circuit and has for its first object to provide a synchro separation circuit effective to assuredly separate the vertical synchronizing signal even when in a weak electric field, by increasing the selection sensitivity of the amplitude separation circuit during at least the vertical synchronizing signal period of the composite video signal.

A second object of the present invention is to provide a synchro separation circuit wherein an integrator for the composite synchronizing signal is constituted by connecting a Miller integrating capacitor to a current mirror circuit in order for a capacitor of small capacitance to be utilized, in achieving a large integrating effect, thereby enabling the circuit to be fabricated into an IC.

A third object of the present invention is to provide a synchro separation circuit wherein there is employed an input transistor of the amplitude separation circuit and a transistor constituting an emitter-follower path for an impedance conversion for supplying the composite video signal to this transistor, which are opposite in operating state to each other, so as to avoid any possible occurrence of the video-in-sink which sould result from the emitter current of the input transistor of the amplitude separation circuit.

DISCLOSURE OF THE INVENTION

The synchro separation circuit according to the present invention comprises an amplitude separation circuit for separating a composite synchronizing signal from a composite video signal and a frequency separation circuit for separating a vertical synchronizing signal from this composite video signal.

Both of the amplitude and frequency separation circuits are preferably fabricated in one-chip IC.

The amplitude separation circuit has an input transistor so designed as to be switched on during the synchronizing period of the composite video signal and to be switched off during the video signal period, a capacitor adapted to be charged upon conduction of said input transistor and its discharge resistor connected between the emitter of said input transistor and an emitter-follower path for supplying the video signal to said input transistor after the impedance conversion has been effected, and a discharge circuit connected in parallel to said discharge resistor and adapted to conduct during at least the vertical synchronizing signal period of the video signal.

The input transistor of the amplitude separation circuit is switched on, when the composite video signal is supplied to the emitter-follower path and a synchronizing signal component of the composite video signal is subsequently fed to the emitter of said input transistor, to allow a current to flow towards the capacitor with the charged current taken from the collector of the input transistor as a synchronizing signal, the potential charged on the capacitor in the above described manner being discharged through the discharge resistor.

From the foregoing, the smaller the resistor of the discharge resistor, the quicker the discharge of the potential on the capacitor. Therefore, the charging current flowing during the subsequent synchronizing signal period becomes so large as to result in the increased separating sensitivity of the composite synchronizing signal.

In the present invention, since no video signal appear during the vertical blanking period, in view of the fact that, when only the vertical synchronizing signal is taken into consideration, the vertical synchronizing signal can no doubt be separated when in a weak electrical field if the separation sensitivity of the composite synchronizing signal is increased, arrangement is made to bring the discharge circuit, connected in parallel to the discharge resistor, in a conductive state during the vertical synchronizing signal period or during the period including the vertical synchronizing period and the duration of an equivalent pulse to cause the potential on said capacitor to be quickly discharged to increase the separation sensitivity of the vertical synchronizing signal.

In a preferred embodiment of the present invention, the frequency separation circuit is so designed that a Miller integrating capacitor is connected between current paths leading respectively to input and output transistors of the current mirror circuit to form an integrator, a current proportional to the composite synchronizing signal, which has been separated from the composite video signal, being fed to the input transistor of the current mirror circuit to enable the output transistor of the current mirror circuit to generate an integrated output voltage.

The integrated output voltage becomes high as the difference between the currents flowing respectively through the current paths leading to the input and output transistors of the current mirror circuit approaches a zero value.

Accordingly, as stated as hereinabove, by the utilization of the current mirror circuit, the difference between the currents flowing respectively through the current paths leading to the input and output transistors of the current mirror circuit becomes zero and the Miller integrating capacitor utilizeable in the present invention may have a small capacitance.

Moreover, in a more preferred embodiment of the present invention, the input transistor of the amplitude separation circuit and the transistor constituting the emitter-follower path are opposite in operating state to each other, i.e., npn type and pnp type, or pnp type and npn type, respectively.

By the utilization of the oppositely conductable transistors as hereinabove described, the emitter current of the input transistor of the amplitude separation circuit can be connected to earth through an emitter-collector path of the transistor forming the emitter-follower path. Therefore, there is no possibility that the emitter current of the input transistor of the amplitude separation circuit flows, after having been added to the emitter current of the transistor of the emitter-follower path through a load resistor connected to the emitter of the transistor of the emitter-follower path, such as occurring where the input transistor of the amplitude separation circuit and the transistor of the emitter-follower path are of the same type.

That is, the transistor of the emitter-follower path can be switched off by the emitter current of the input transistor of the amplitude separation circuit, thereby avoiding any possible occurrence of the so-called video-in-sink.

By constructing the synchro separation circuit in the manner described above, the separation sensitivity for the vertical synchronizing signal can be improved. In addition, the integrating capacitor used in the frequency separation circuit may have a small capacitance and, therefore, the synchro separation circuit can easily be fabricated into an IC.

BEST MODE FOR CARRYING OUT THE INVENTION

Figure 1:
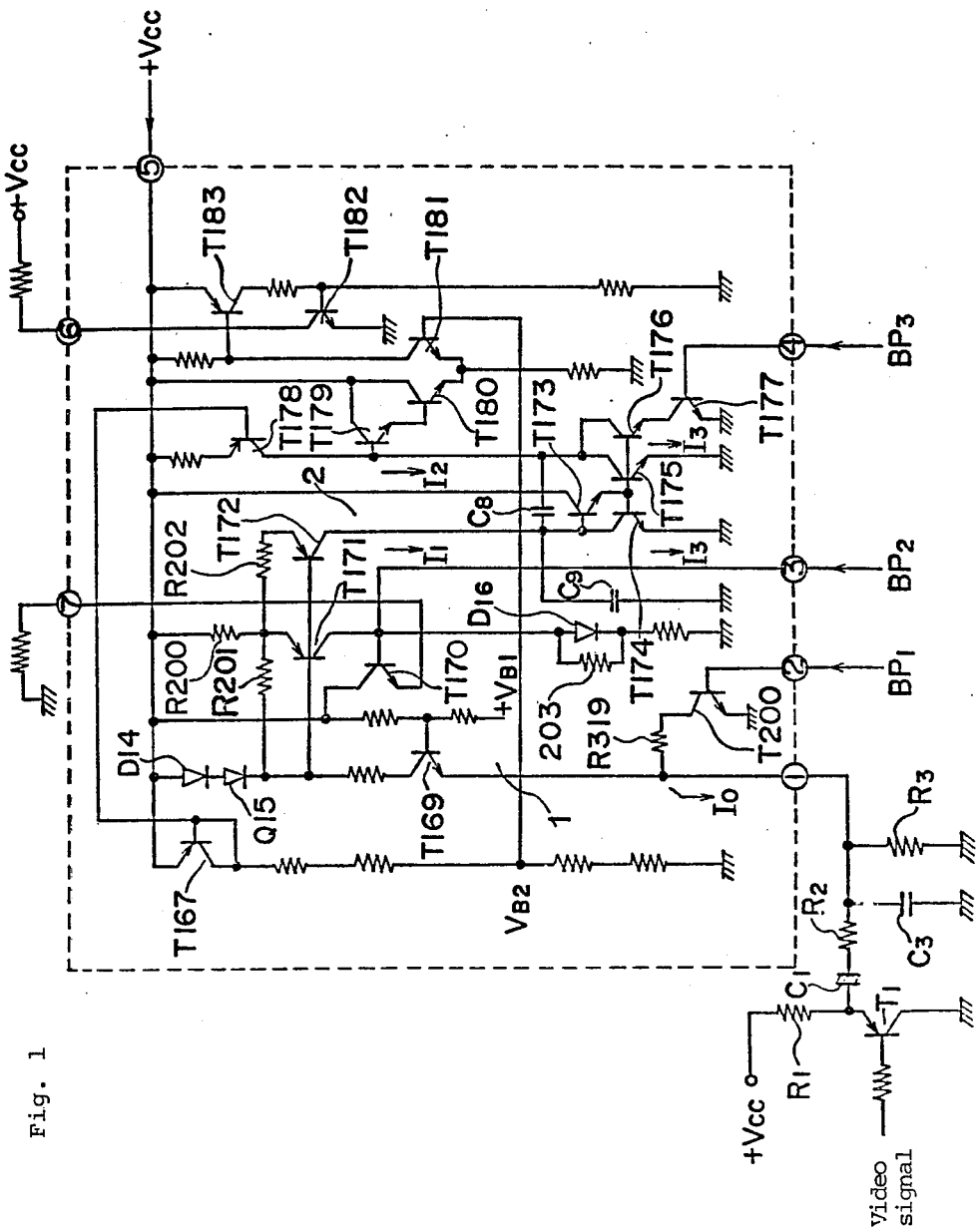
FIG. 1 is a circuit diagram showing a synchro separation circuit according to one embodiment of the present invention.

FIG. 1 illustrates one embodiment of a synchro separation circuit according to the present invention. A portion of this circuit encircled by the broken line can be formed into an IC and, in this IC, transistors T169~T171 and T200, diodes D14~D16, etc., form an amplitude separation circuit 1 while the other transistors T172~T183, a capacitor C8, etc., form a frequency separation circuit 2.

The amplitude separation circuit 1 is so designed that a video signal fed to a 1 pin through an emitter-follower transistor $T_1$ externally connected for the impedance conversion, a coupling capacitor $C_1$ and a filter formed by a resistor $R_2$ and a capacitor $C_3$ is further fed to the emitter of the transistor T169 and that a synchronizing signal appearing at the collector of the transistor T171 in response to the transistor T169 can be drawn from a 7 pin through the transistor T170. However, care should be taken to the following points. The first point to note is that the externally connected transistor $T_1$ is selected to be a pnp-type in opposite relation to the npn-type transistor T169 included in the IC and the second point to note is that a first vertical timing pulse $BP_1$ of positive polarity is adapted to be fed to the base of the transistor T200 through a 2 pin whereas a second vertical timing pulse $BP_2$ of negative polarity is adapted to the base of the transistor T170 through a 3 pin.

On the other hand, the frequency separation circuit 2 is so designed that the synchronizing signal appearing at the collector of the transistor T172 is integrated by a circuit, comprising the transistors T173~T175 and capacitors $C_8$ and $C_9$ to provide an integrated output signal which is in turn compared with a predetermined voltage by a circuit comprising the transistors T179~T181 to separate a vertical synchronizing signal, said vertical synchronizing signal being drawn from a 6 pin after having been amplified by the transistors T183 and T182. In this connection, care should be taken to the following points. In the first place, the transistors T173~T175 constitute a current Miller circuit with a mirror integrating capacitor $C_8$ connected between the respective collectors of the transistors T174 and T175 and this is the first point to note. The second point to note is that the transistors T172 and T178 inserted in respective current paths on input and output sides of the current mirror circuit constitute a source of small current together with the transistors T171 and T167.

The third point to note is that the base of the transistor T177 below the transistor T176 connected in parallel to the transistor T176 of said current mirror circuit is adapted to receive a third vertical timing pulse $BP_3$ of positive polarity.

The circuit of FIG. 1 is constructed substantially in the manner as hereinabove described and, hereinafter, the details of the operation of each portion thereof will be described.

(OPERATION OF THE AMPLITUDE SEPARATION CIRCUIT)

The potential at the 1 pin is so selected that the transistor T169 can attain a substantially cut-off point during the absence of any signal and it is assumed that a synchronizing signal component S of a composite video signal (See FIG. 4(a)) of positive polarity fed from the transistor T1 through the capacitor $C_1$ is applied to the 1 pin. In this condition, the transistor T169 is switched on with the potential at the emitter thereof lowered to allow the flow of a current $I_0$, resulting in the capacitor $C_1$ charged with a voltage of such a polarity as shown.

Figure 4:
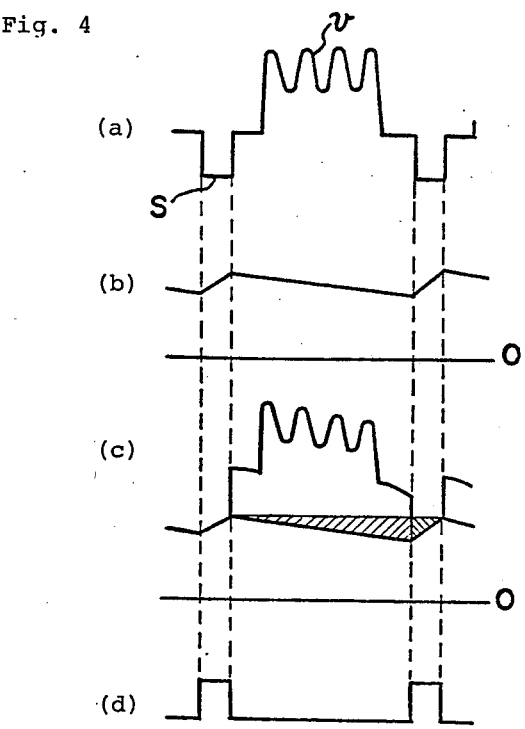
FIGS. 4 and 5 are diagrams showing waveforms for the explanation of the operation of the synchro separation circuit of FIG. 1.

Subsequently, when a video signal component V of the composite video signal arrives, the transistor T169 is cut off and the capacitor $C_1$ discharges through the resistors $R_2$ and $R_3$. Moreover, for a synchronizing signal component of the next composite video signal charging takes place in an amount which has been discharged during the preceding video signal period. Because of this, the direct current potential at the 1 pin and a signal appearing at the 1 pin are such as shown in FIGS. 4(b) and 4(c). Accordingly, the transistor T171 conducts only during the period (reverse-hatched area in FIG. 4) in which the charging current flows towards the capacitor $C_1$ and, therefore, the synchronizing signal such as shown in FIG. 4(d) emerges from the collector of the transistor T171. At this time, since the collector current of the transistor T171 is limited to a value determined by set-up voltage of the diodes $D_{14}$ and $D_{15}$, the base-emitter voltage of the transistor T171 and the resistance of a resistor R200, the transistor T171 when switched on operates in an active region.

On the other hand, since the timing pulse $BP_2$ of negative polarity having a pulse width corresponding to the vertical synchronizing signal period and the equivalent pulse duration adjacent thereto is applied to the 1 pin, the transistor T170 is forcibly switched off during that period. Because of this, the horizontal synchronizing signal formed by removing the vertical synchronizing signal and the equivalent pulse from the composite synchronizing signal drawn from the collector of the transistor T171 can be fed to a 7 pin through the transistor. The reason for the separation of the horizontal synchronizing signal in this manner is to avoid a horizontal AFC circuit from being adversely affected by the vertical synchronizing signal and the equivalent pulse. However, since this has no concern with the present invention, the description thereof is herein omitted.

Figure 2:
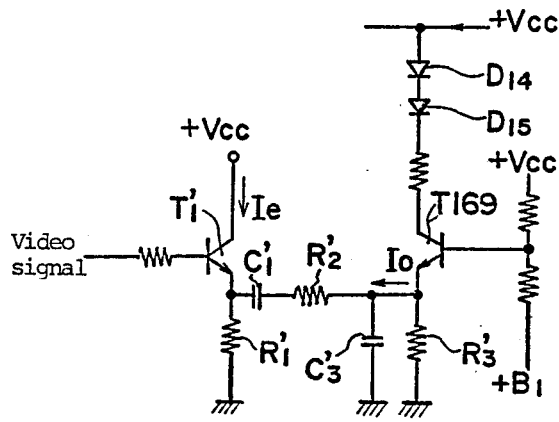
FIGS. 2 and 3 are circuit diagrams of conventional synchro separation circuits.

The reason that the externally connected emitter-follower transistor $T_1$ is so selected as to operate in a state opposite to the transistor T169 is as follows. Namely, for example, such as in the conventional circuit shown in FIG. 2, where a transistor $T_1'$ is of the same type as the transistor T169, the current $I_0$ flows in a direction as shown and, after having been added to the emitter current $I_e$ of the transistor $T_1'$, flows through the resistor $R_1$. Because of this, if the direct current level of the video signal is relatively high, there is the possibility that the transistor $T_1'$ is cut off by the current $I_0$ (thereby constituting a cause of the so-called video-in-sink). Accordingly, in order to eliminate this, an emitter resistor $R_1'$ shown in FIG. 2 must have a relatively low resistance, which, however, results in the increased emitter current of the transistor $T_1'$ with the increased loss of the electrical power occurring at the transistor $T_1'$. Therefore, this can not be considered a wire counter measures. On the contrary thereto, where the construction is made as hereinbefore described, the emitter current $I_0$ flowing during the conduction of the transistor T169 will not flow through the resistor $R_1$ connected to the emitter of the transistor $T_1$, but flows to earth through the collector-emitter path of the transistor $T_1$. Therefore, the emitter current $I_0$ will not bring any influence on the operation of the transistor $T_1$. In view of this, by selecting a high resistance for the resistor $R_1$, the emitter current of the transistor $T_1$ can be reduced with the consequent reduction of the power loss.

Hereinafter, the reason for the employment of the transistor T200 will be described.

As can readily be understood from the foregoing the increase of the separation sensitivity of the amplitude separation circuit can be achieved by selecting a low resistance for the externally connected discharge resistor $R_3$ to allow the discharge in a large amount. However, if the separation sensitivity is increased in this manner, a problem of the so-called video-in-sink arises wherein the video signal component is erroneously separated as a synchronizing signal. However, since no video signal appear during the vertical blanking period, so far as the vertical synchronizing period is involved, the increased separation sensitivity is effective to assuredly separate the vertical synchronizing signal when in a weak electrical field.

In order to resolve this incompatible problem, in the circuit of FIG. 1, the transistor T200 is utilized, which transistor T200 is adapted to be switched on during the vertical synchronizing signal period or during the period including the vertical synchronizing signal period and the equivalent pulse duration adjacent thereto, so that the composite resistance of the discharge resistor $R_3$ and the resistor R319 connected in parallel thereto in the IC can be reduced to increase the separation sensitivity for the vertical synchronizing signal. For this purpose, the 2 pin is adapted to receive the timing pulse $BP_1$ of positive polarity opposite to the polarity of the pulse $BP_2$ fed to the 3 pin or having a pulse width corresponding to the vertical synchronizing signal period.

Although the vertical blanking pulse may be generally be used for each of these pulses $BP_1$ and $BP_2$ especially in a system wherein a vertical driving pulse is prepared by counting down an output from a reference oscillator the frequency of which is automatically controlled in reference to the horizontal synchronizing signal appearing at the 1 pin, by the use of a count-down circuit, each of the pulses $BP_1$ and $BP_2$ can be readily obtained from the count-down circuit referred to above.

(OPERATION OF THE FREQUENCY SEPARATION CIRCUIT)

In the first place, the small constant current sources formed by the transistors T171 and T172 and the transistors T167 and T178 will be described. Assuming now that the base-emitter voltages of the respective transistors T171 and T172 are $V_{BE1}$ and $V_{BE2}$, respectively, the emitter current of the transistor T172 is $(1/R_{202})(V_{BE1} - V_{BE2})$. Because of this, since the value of $V_{BE1} - V_{BE2}$ can be sufficiently reduced to a small value even though the resistor $R_{202}$ cannot be selected to have a high resistance (it is difficult to make a resistor in the order of MΩ in the IC, a sufficiently small current can flow through the transistor T172. By the same reason, a sufficiently small current can flow through the transistor T178, too.

The current Miller circuit constituted by the transistors T173~T175 will now be described. It is assumed that the collector currents of the transistors T172 and T178 are $I_1$ and $I_2$, respectively, that the respective collector current of the transistors T174 and T175 are equal to each other, they are expressed by $I_3$, and that the current flowing to the collector of the transistor T175 from the collector of the transistor T174 through the Miller integrating capacitor C8 is expressed by $I_4$. Then, $I_1=I_3+I_4$, $I_3=I_4+I_2$, and therefore, $I_4=\frac{1}{2}(I_1-I_2)$. Since the input impedance of the transistors T173 and T175 when viewed from the base of the transistor T173 is very high (similar to that in the Darlington connection), it can be negligible and, therefore, the integrated output voltage $E_0$ (See FIG. 5(b)) appearing at the collector of the transistor T175, if the base-emitter voltage of the transistors T173 and T175 is expressed by $V_{BE}$, can be given by the following equation.

$$E_0 = Vcc - (1/J\omega C_8)I_4 + 2V_{BE}$$

Accordingly, as a result,
$$E_0 = Vcc + 2V_{BE} - 1/j\omega C_8(I_1-I_2)$$

Because of this, in order to increase the integrated output voltage $E_0$, it is desirable to decrease the value of $I_1-I_2$ to a small value. However, where each of these currents is supplied from a power source $+Vcc$ through a resistor, it is difficult to render $I_1-I_2$ to be a sufficiently small value due to deviation in resistance from one resistor to another. In view of this, in the present invention, the small constant current sources constituted respectively by the transistors T171 and T172 and the transistors T167 and T178 are utilized to provide low values of $I_1$ and $I_2$ so that the value of $I_1-I_2$ can ultimately be reduced to a very small value. By so doing, even if the Miller integrating capacitor C8 has such a small capacitance as can be fabricated in the IC, a relatively high integrated voltage $E_0$ can be obtained.

Figure 3:
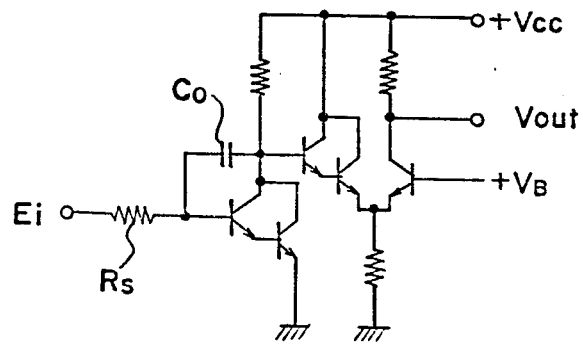

That is, in the conventional circuit such as shown in FIG. 3, since the output voltage $E_0$ can be given by the equation, $$E_0 = Vcc - (Ei - 2V_{BE})/Rs \cdot (1/J\omega Co) + 2V_{BE}$$

the capacitor Co and the resistor Rs must be of high capacitance and resistance in order to give the high integrated output voltage $V_0$.

Figure 5:
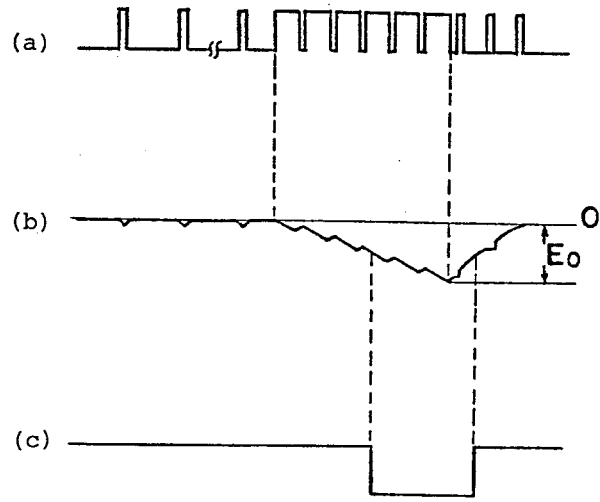

As it has now become clear from the foregoing, since the collector current (FIG. 5(a)) proportional to the amplitude of the composite synchronizing signal flows through the transistor T172 and is then integrated by the current mirror circuit, a voltage shown in FIG. 5(b) appears at the collector of the transistor T175. This voltage is in turn compared with a predetermined voltage $V_{B2}$ by differential pairs comprising the transistors T179–T181 and, therefore, a vertical synchronizing signal such as shown in FIG. 5(c) appears at the collector of the transistor T181, which vertical synchronizing signal emerges from the 6 pin after having passed through the transistors T182 and T183.

Finally, the operation of each of the transistors T176 and T177 will now be described. Namely, since the frequency separation circuit operates in the manner described above, it is advisable to render the gain of the above described integrator (transistor T173~T175) to be large only relative to the vertical synchronizing signal in order for the vertical synchronizing signal to be sufficiently separated. For this purpose, the timing pulse BP3 of positive polarity having a pulse width corresponding to the vertical synchronizing signal period of the composite video signal is applied to the transistor T177 through the 4 pin to switch on the transistor T177 and the transistor T176 so that the collector current $I_2$ of the transistor T178 can be increased during the vertical synchronizing signal period to increase the previously described integrated output voltage $E_0$. It is to be noted that C9 represent a capacitor for removing noises.

Although the fundamental embodiment of the present invention has been set forth in the foregoing description, the present invention should not be limited to such embodiment, but can be modified within the scope of the appended claims.

I claim:

1. A synchro separation circuit characterized in that it comprises an amplitude separation circuit for separating a composite synchronizing signal from a composite video signal, a frequency separation circuit for separating a vertical synchronizing signal from said composite synchronizing signal, a capacitor and its discharge resistor means connected between the emitter of an input transistor of said amplitude separation circuit, which is operable as a base-grounded transistor adapted to be cut off during the video signal period of said composite video signal and an emitter of an emitter-follower transistor supplying the composite video signal to said input transistor, means for charging said capacitor upon conduction of said input transistor, and a discharge circuit connected in parallel to said discharge resistor means for operating only during at least the vertical synchronizing signal period of the composite video signal.

2. A synchro separation circuit as defined in claim 1, characterized in that a Miller integrating capacitor is connected between current paths leading respectively to input and output transistors of a current Miller circuit to form an integrator, a current proportional to the composite synchronizing signal, which has been separated from the composite video signal, being fed to the input transistor of the current mirror circuit to enable the output transistor of the current mirror circuit to generate an integrated output voltage, means for comparing said integrated output voltage with a predetermined voltage to provide said separated vertical synchronizing signal.

3. A synchro separation circuit as defined in claim 1, characterized in that current paths leading respectively to the input and output paths of the current mirror circuit has inserted therein a circuit for setting the current flowing through each of the current paths to a small value.

4. A synchro separation circuit as defined in any one of claims 1 to 3, characterized in that the input transistor of said amplitude separation circuit and a transistor forming the emitter-follower path are opposite in operating state to each other.

* * * * *